United States Patent [19]

Micard

[11] Patent Number: 4,684,104
[45] Date of Patent: Aug. 4, 1987

[54] ELECTRICALLY CONTROLLED VALVE WITH PIEZOELECTRIC EFFECT

[75] Inventor: Guy Micard, Montesson, France

[73] Assignee: Solex and Regie Nationale des Usines Renault, France

[21] Appl. No.: 752,511

[22] Filed: Jul. 8, 1985

[30] Foreign Application Priority Data

Jul. 6, 1984 [FR] France .................. 84 10834

[51] Int. Cl.$^4$ .................. F16K 31/08; F02M 27/08
[52] U.S. Cl. .................. 251/129.05; 251/129.06; 251/129.14; 239/585; 239/102.2
[58] Field of Search .................. 251/129.06, 129.05, 251/129.14; 239/102, 585

[56] References Cited

U.S. PATENT DOCUMENTS

| | | |
|---|---|---|
| 3,884,417 | 5/1975 | Sheffield et al. ........... 251/129.05 X |
| 3,995,813 | 12/1976 | Bart . |
| 4,022,166 | 5/1977 | Bart . |
| 4,469,974 | 9/1984 | Speranza .................. 239/102 X |
| 4,548,047 | 10/1985 | Hayashi et al. ............ 251/129.05 X |

*Primary Examiner*—Arnold Rosenthal
*Attorney, Agent, or Firm*—Larson and Taylor

[57] ABSTRACT

A piezoelectric effect electrically actuated valve suitable for use as actuator in an internal combustion engine carburetor, comprises a case in which a fluid passage is provided. A closure member is movable between two positions (full opening and small or zero opening). The movements of the closure member are controlled by at least one piezoelectric element. The electrically controlled valve may have monostable or bistable operation.

7 Claims, 4 Drawing Figures

ELECTRICALLY CONTROLLED VALVE WITH PIEZOELECTRIC EFFECT

FIELD OF THE INVENTION

The invention relates to an electrically controlled valve of the type comprising a case in which a fluid passage is formed and a closure member movable in the case between two positions (full opening and small or zero opening), the movements of the member being controlled by at least one piezoelectric element. The invention is particularly suitable for use in systems for supplying an internal combustion engine with liquid fuel under a moderate pressure difference.

PRIOR ART

Valves are already known using the so-called "reverse" piezoelectric effet, i.e. the deformation of a piezoelectric element under the action of an electric field. The movements which can thus be obtained remain very small, of the order of 0.5 micron per millimeter of thickness for an electric field of $10^6$ volts per meter. To increase the available movement, several elements can be stacked but the increase obtained remains small. It has also been proposed to cause the piezoelectric element to work at its resonance frequency, so as to obtain a maximum amount of oscillation. This solution has drawbacks, particularly of imposing the frequency of operation and the duty ratio of the valve, so that only the amplitude of the control signal can be adjusted for metering the delivery rate. In addition, the amounts of movements remain small.

SUMMARY OF THE INVENTION

It is an object of the invention to provide a valve of the above defined type having a substantially larger movement of the closure member. It is another object to overcome the need to work at an imposed frequency and/or with a duty ratio equal to ½.

To this end, there is provided an electrically controlled valve whose closure member is independent of the piezoelectric element and is associated with said element so as to be projected from one to the other of its positions in response to the energization or deenergizaton of the piezoelectric element.

The role of the piezoelectric element (or of each such element) in a valve in accordance with the invention is very different from that which it has in prior art valves. It does not move the closure member by a predetermined amount, but communicates thereto an initial speed. Thus movements may be obtained of several hundreds of microns which have the additional advantage of being independent of the extension elongation of the piezoelectric assembly, so of the variations of the extension due to temperature and ageing. The only important parameter is the speed which the piezoelectric element imparts to the closure member.

The only condition to be fulfilled is that the kinetic energy which the piezoelectric element communicates to the closure member should be greater than the work of the mechanical return force which biases the closure member to its initial position, for the desired stroke of the valve.

In a first embodiment of the valve, which may be termed monostable, the closure member is associated with means for returning it to its original position, which means exert a force which increases with the stroke. These means are formed for example by a return spring. In this case, the opening time of the valve is equal to the "flight time" of the closure member and corresponds to a predetermined injected volume. The total throughput (or volume) to be supplied is obtained by accumulating elementary volumes so that the delivered throughput or volume is metered by adjusting the energization frequency or the number of energizations. The maximum throughput which the electrically controlled valve may transmit, when return means tend to close the valving means, will be determined by the maximum frequency which can be obtained, fixed by the flight time.

In a second embodiment, which may be termed bistable, the closure means is associated with return means whose return force decreases with the elongation, disappears, then is reversed, generally in the middle of the space between the two positions which the closure member may assume. Return to the original position imposes a second action or percussion, opposite in direction to the first one. The return means may then be formed by magnetic forces. Two embodiments are possible, movement from one position to the other being always caused by the contraction or expansion of a piezoelectric element. In one of the embodiments, generally more advantageous for it leads to a more compact device, the valve comprises a stack of thin piezoelectric ceramics. Expansion of the stack causes movement in one directon, contraction causing movement in the other direction. In an other embodiment, two different piezoelectric elements are used each for projecting the closure member in one of two opposite directions. In both cases, the main control parameter is no longer the frequency, but the duty cycle of the signal supplied in the first case, the phase difference of two signals in the second.

The invention will be better understood from the following description of particular embodiments of the invention given by way of examples.

SHORT DESCRIPTION OF THE DRAWINGS

FIG. 1 is a diagrammatic view of a bistable valve according to a first embodiment, shown in crosssection through an axial plane;

FIG. 2, similar to FIG. 1, shows a possible construction of the valve whose principle is given in FIG. 1;

FIG. 3, similar to FIG. 2, shows another embodiment; and

FIG. 4, similar to FIG. 3, shows a modification thereof.

DETAILED DESCRIPTION OF PARTICULAR EMBODIMENTS

Figure 1:
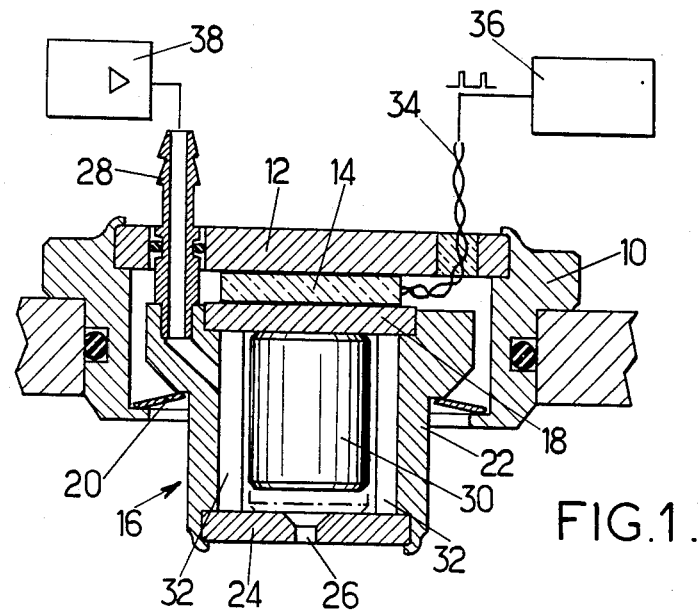

Referring to FIG. 1, an electrically controlled valve comprises a mounting socket 10, having a groove receiving an O-ring seal, to which a base plate 12 is fixed, for example by crimping. A piezoelectric element 14 of conventional type, generally formed by a stack of piezoelectric ceramics, is clamped between the base plate 12 and the bottom wall 18 of a case 16 by a resilient prestressed element 20 which will generally be formed by a Belleville washer or an elastomer ring. The case also comprises a thimble 22 and a seat 24 in which a central port 26 is formed for providing a passage for the fluid whose flow is to be controlled by the valve. The case 16 defines an inner cylindrical chamber provided with a fluid intake connection 28. A cylindrical closure member 30 of a diameter such that it is guided by the thimble 22 is received in the case. The length of the closure or valve member 30 is such that it may move between a position where it bears on the bottom 18 (shown with a continuous line in FIG. 1) and a position closing the port 26 (shown with a dash dot line). Internal grooves 32 formed in the thimble allow the fuel to flow through the chamber and arrive at port 26 when the closure member 30 is in its fully open position, in abutment against the upper end 18.

In this embodiment, the closure member 30 must be subjected to a return force which varies in reverse relation with the distance from its original position and reversed halfway along its travel. Magnetic forces may be used. For that, the closure member 30 may be formed by a magnet whereas the bottom 18 and seat 24 both operating as abutment means are formed by ferromagnetic material plates joined together by a thimble 22 of non-magnetic material.

The piezoelectric element 14 has opposite metallized faces connected to output leads 34 which may be connected to a square signal generator 36 having an adjustable duty cycle.

In the case where the electrically controlled valve is used as an actuator for feeding fuel or an air/fuel primary mixture in a carburettor or as a low pressure injection valve, connection 28 will be connected to a fuel source 38 at a predetermined pressure. Generator 36 may for instance supply pulses at a fixed frequency or at the ignition frequency.

The operation of the electrically controlled valve of FIG. 1 is then as follows. With the closure member 30 originally in abutment against the bottom 18, the leading edge of the square wave signal emitted by generator 36 causes element 14 to expand axially. This sudden expansion projects the closure member 30 towards seat 26 at a predetermined speed. As soon as member 30 has gone past the middle of its travel, the magnetic forces which are exerted thereon tend to attract it towards the seat 24 and then to hold it in position. When the trailing edge of the square wave signal is applied to element 14, the latter contracts. Case 16 follows the contraction due to the action of the resilient element 20. Seat 24 sends member 30 back towards its origin position with a speed approximately equal to its outgoing speed. The useful stroke of the closure means 30 is independent of the extension of the piezoelectric element 14.

Figure 2:
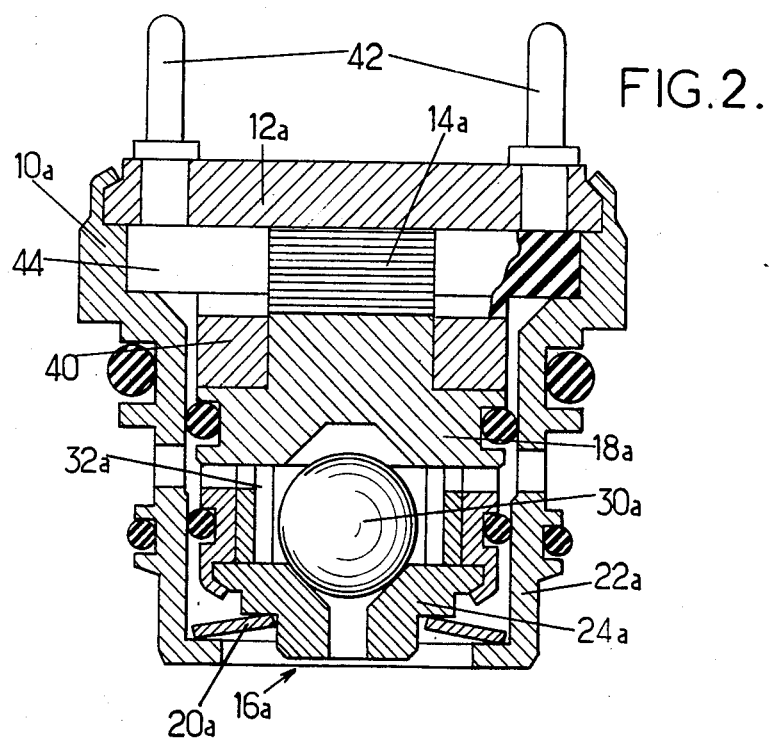

Referring to FIG. 2, an embodiment is shown where the elements corresponding to those shown in FIG. 1 bear the same reference number with index a; it differs essentially from the first one in that the closure member 30a is a ball of ferromagnetic material rather than a permanent magnet, while a permanent magnet is incorporated in the case. Piezoelectric element 14a is clamped between base plate 12a and bottom 18a of the case by the resilient prestressed element 20a. A single permanent return magnet 40 is placed about a narrowed position of bottom 18a. In this embodiment, the whole case (bottom 18a, thimble 22a and seat 24a) is of ferromagnetic material for providing a path for the lines of force of the magnetic field of the permanent magnet 40. As compared with the embodiment shown in FIG. 1, this solution has the advantage of allowing the manufacturing tolerances required for the closure member to be more easily complied with, since steel ball 30a may have tighter tolerances than a cylindrical part machined from material useable for forming a permanent magnet, such as a ferrite. The parasite pressure forces which must be overcome for ligting the closure member are less for the same weight of the member. Finally, the spherical bearing surface of a ball on a cone shaped wall offers a better seal than a plane-on-plane engagement.

In FIG. 2, the electric connections have been shown in the form of pins 42 connected to metal layers of element 14a by means of leads protected by an insulating material ring 44 (plastic material for example).

With the last signal edge received by the piezoelectric element 14 or 14a being a trailing edge, the valves of FIGS. 1 and 2 will be of the open type at rest. This solution is generally used in an actuator for a carburettor, so that failure of the electric system allows the engine to operate. But electrically controlled valves may also be constructed which are closed at rest.

Figure 3:
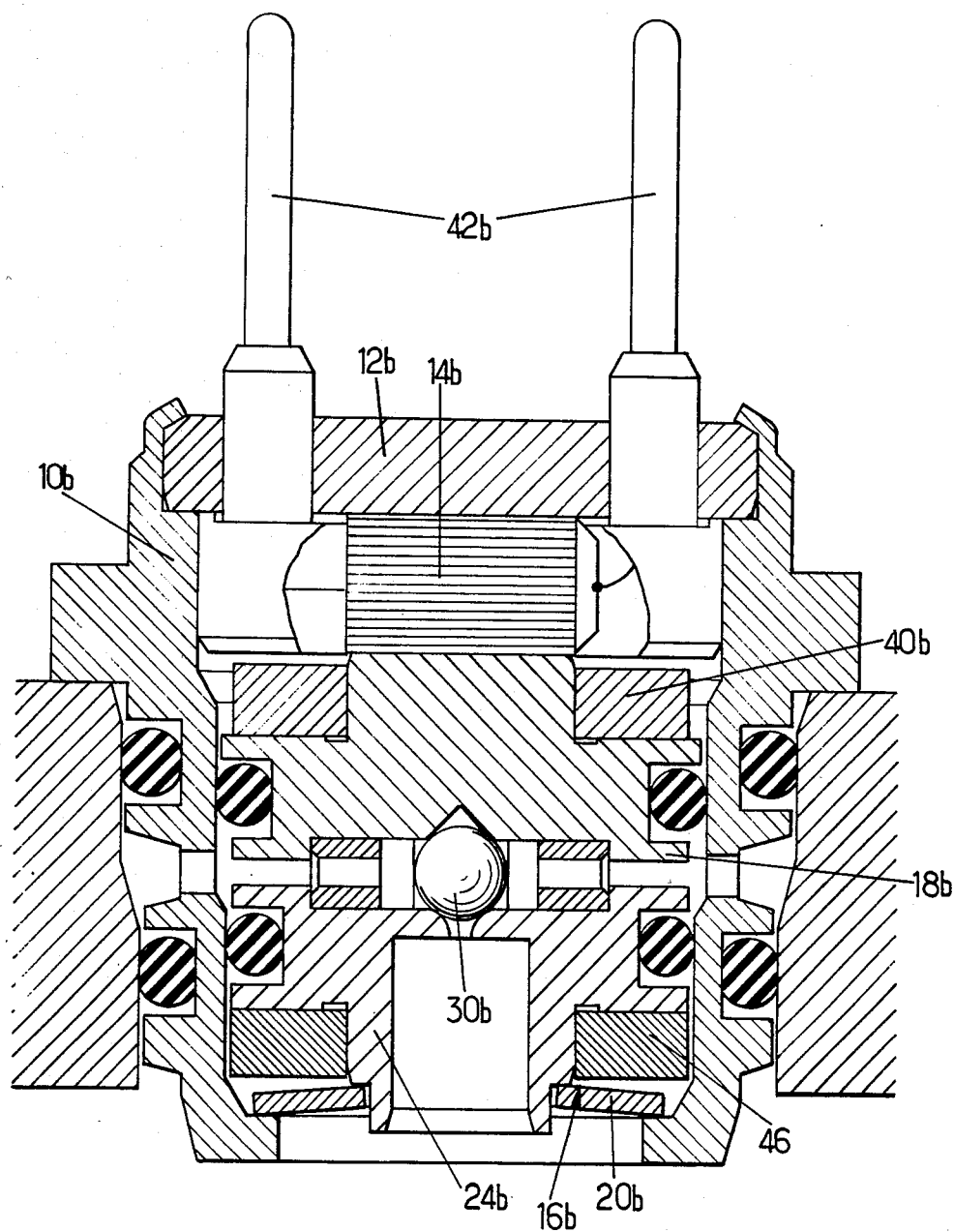

The embodiment shown in FIG. 3, in which the elements corresponding to those shown in FIG. 2 are designated by the same reference number to which the index b has been added, differs essentially from the preceding one in that it comprises two permanent return magnets 40b and 46. As in the case of FIG. 2, fuel is admitted in an annular space formed around the injector body and defined by O-ring seals.

Figure 4:
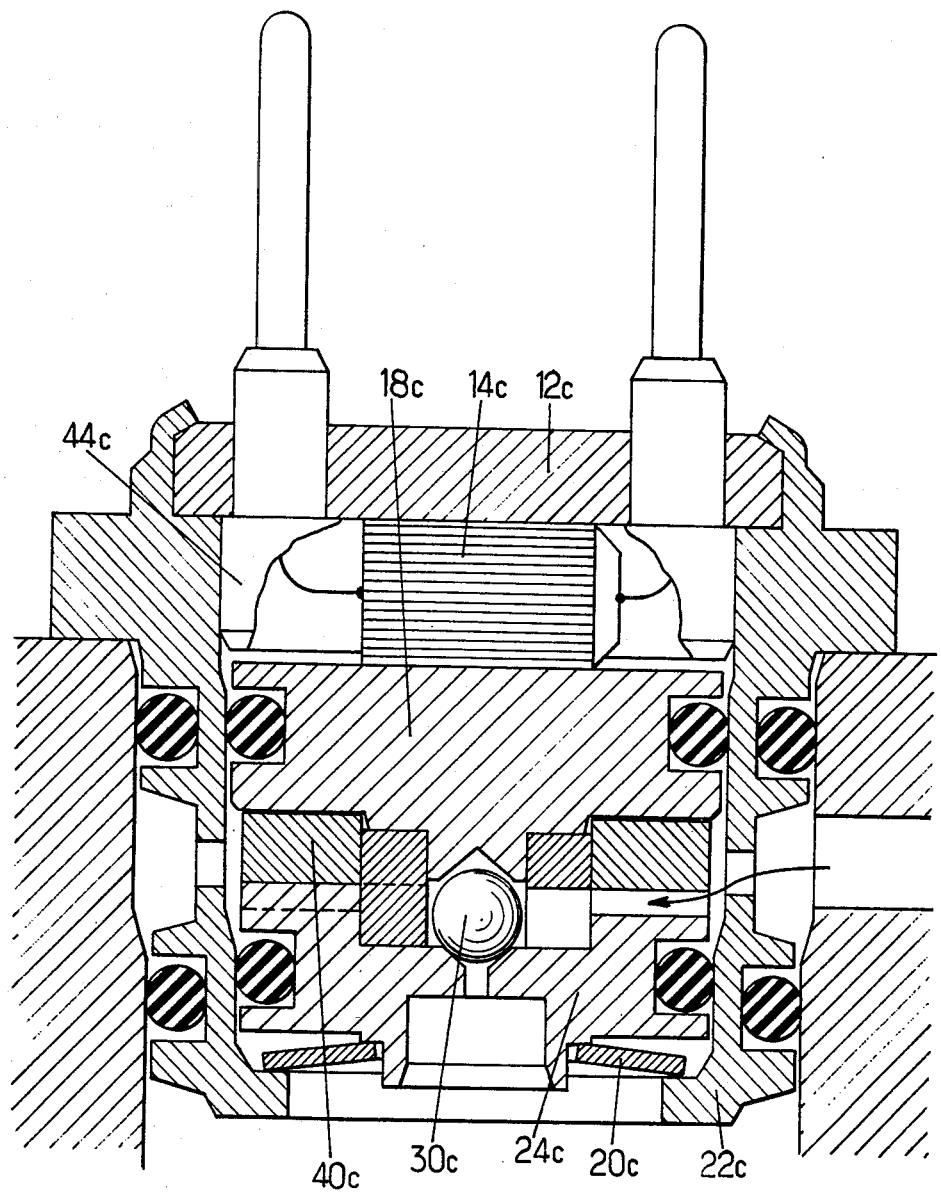

Referring to FIG. 4, where the elements corresponding to those shown in FIG. 2 are designated by the same reference number with index c, there is shown an embodiment which differs from FIG. 2 essentially in that the permanent magnet 40c is located between part 24c formed with the ball seat and outlet port and bottom wall 18c, thereby improving the magnetic circuit.

I claim:

1. Electrically connected valve comprising:
   a casing defining a fluid passage surrounded by a valve seat,
   a closure member in said casing movable between a first abutment position and a second abutment position with respect to said valve seat,
   piezoelectric means arranged for exerting on said closure member a percussion force for throwing said closure member from the first abutment position to the second abutment position upon application of an electrical voltage to said piezoelectric means and for throwing said closure member from the second abutment position to the first abutment position upon removal of said electrical voltage,
   and means distinct from said piezoelectric means for retaining said closure member in the abutment positions with a force lower than the force exerted by said piezoelectric element upon application and removal of said voltage.

2. Valve according to claim 1, wherein the piezoelectric means is operatively associated with a generator generating square electric pulses having an adjustable duty cycle at a variable frequency.

3. Electrically controlled valve comprising:
   a base plate,
   a casing having a bottom wall, a lateral wall and a seat formed with an opening, said casing defining a fluid passage,
   a closure member in said casing movable between a first abutment position and a second abutment position with respect to said seat,
   a piezoelectric element clamped between said base plate and said bottom wall,
   a resilient pre-stressed element located between said base plate and casing for retaining said piezoelectric element under compression, whereby expansion of the piezoelectric element exerts a percussion on the closure member through said bottom wall while contraction thereof causes the application of a percussion to the closure member by the seat and magnetic return means exerting a force on said closure member against the bottom wall or the seat depending on whether it is closer to the bottom wall or the seat.

4. Electrically controlled valve comprising a casing defining a fluid passage, a closure member in said casing movable between two predetermined positions, and at least one piezoelectric element for actuation of said closure member, wherein said closure member is separated from the piezoelectric element and is operatively connected via abutment means with said element so as to be projected from one to the other of said two positions in response to energization and deenergization of the piezoelectric element, respectively, wherein the closure member is associated with return means exerting a force on said closure member which reverses in direction when the closure member has travelled over substantially half of its complete travel from one of said two predetermined positions to the other position.

5. Valve according to claim 4, wherein said closure member is arranged for movement between a seat forming first abutment means and a bottom forming second abutment means, said return means exerting a magnetic force tending to apply the closure member against the bottom or the seat depending on whether it is closer to the bottom or the seat.

6. Valve according to claim 5, wherein the closure member is a permanent magnet and the bottom and the seat are formed from a ferromagnetic material and are connected together by an annular thimble of non ferromagnetic material.

7. Valve according to claim 5, wherein said closure member is of ferromagnetic material and is contained in a case comprising at least one magnet and a ferromagnetic circuit.

* * * * *